United States Patent [19]

Markley et al.

[11] Patent Number: 4,654,856

[45] Date of Patent: Mar. 31, 1987

[54] LASER BEAM PROJECTION DEVICE AND ARRANGEMENT FOR MOUNTING A LASER PLASMA TUBE THEREIN

[75] Inventors: Theodore J. Markley, Vandalia; Ted L. Teach, Dayton; Edward E. Hart, Springfield; William C. Pohl, Spring Valley, all of Ohio

[73] Assignee: Spectra-Physics, Inc., Dayton, Ohio

[21] Appl. No.: 781,912

[22] Filed: Sep. 27, 1985

[51] Int. Cl.$^4$ ............................................. H01S 3/03
[52] U.S. Cl. ..................................... 372/65; 372/107; 372/108
[58] Field of Search ................... 372/61, 65, 107, 108

[56] References Cited

U.S. PATENT DOCUMENTS

| | | | |
|---|---|---|---|
| 3,400,596 | 9/1968 | Laich | 372/107 |
| 3,553,604 | 1/1971 | Andress et al. | 372/107 |
| 3,805,015 | 4/1974 | Herziger et al. | 372/107 |
| 3,847,703 | 11/1974 | Kaiser | 372/65 |
| 4,045,129 | 8/1977 | Hamar | 372/107 |
| 4,062,634 | 12/1977 | Raudo et al. | |
| 4,203,080 | 5/1980 | Wright et al. | 372/65 |

*Primary Examiner*—Leon Scott, Jr.

*Attorney, Agent, or Firm*—Killworth, Gottman, Hagan & Schaeff

[57] ABSTRACT

A laser beam projection device includes a laser plasma tube assembly having a laser plasma tube and a generally cylindrical casing surrounding the tube. The plasma tube is positioned within the casing such that the beam produced by the tube is aligned with the casing and emerges from the casing through a circular opening at one end thereof. A support frame is provided for mounting the laser plasma tube assembly and also for mounting one or more optical elements in precise alignment with respect to the beam produced by the tube assembly. The frame includes an annular member for engaging the circular opening in the casing in order to align the casing with respect to the frame. The frame further defines a pair of non-parallel alignment surfaces, spaced from the annular member, to contact the outer surface of the casing near the end thereof opposite the circular opening. The casing defines an inner beveled surface surrounding the opening through which the beam emerges. The annular member defines an outer, generally tapered surface which engages the inner beveled surface of the casing and holds the casing in alignment with the support frame.

17 Claims, 4 Drawing Figures

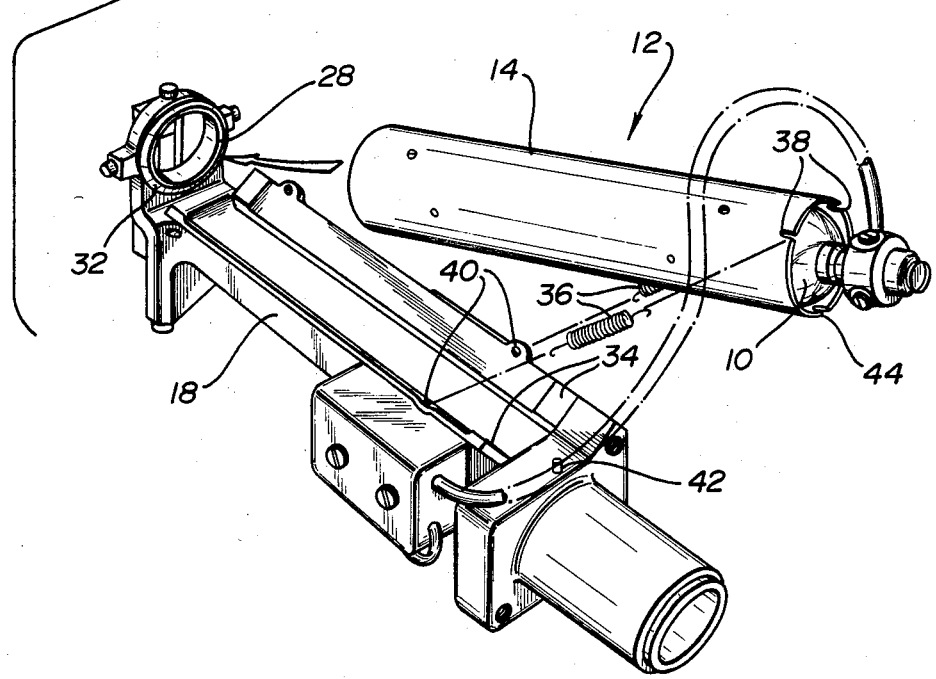
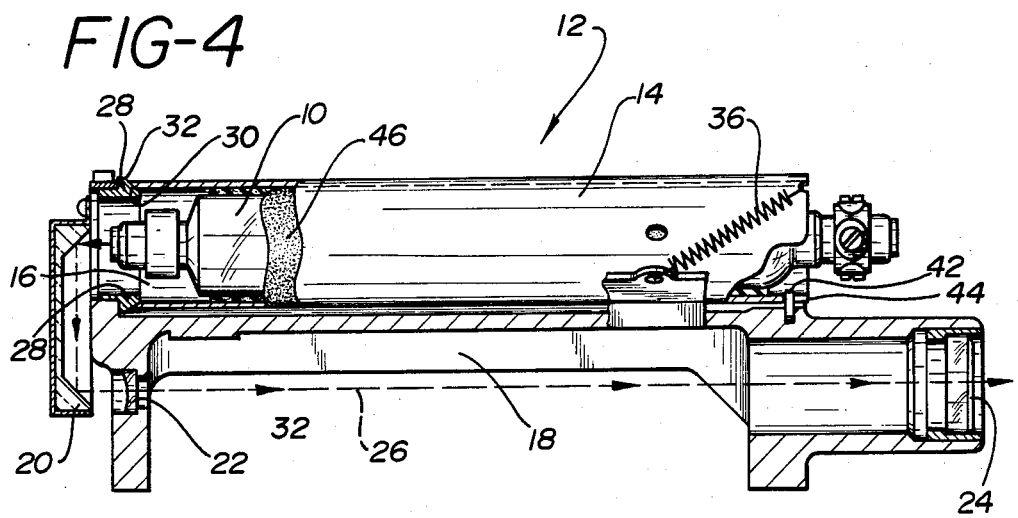

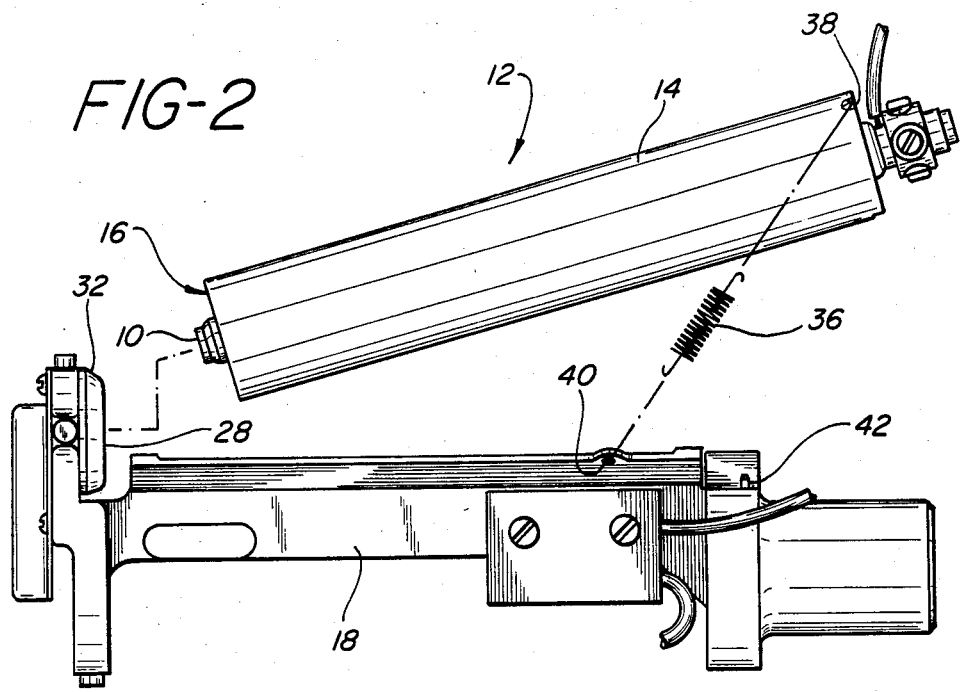
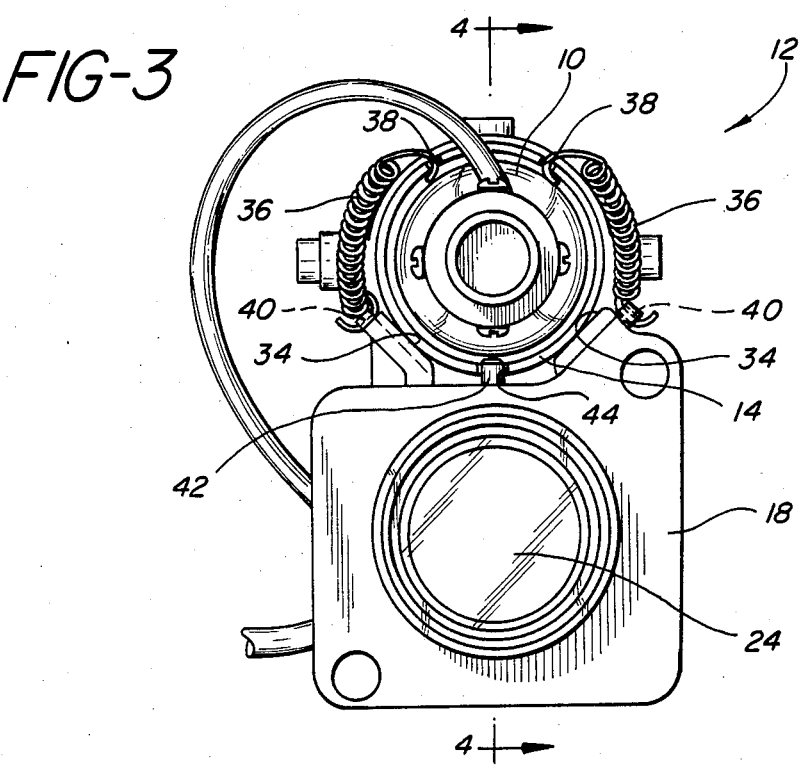

LASER BEAM PROJECTION DEVICE AND ARRANGEMENT FOR MOUNTING A LASER PLASMA TUBE THEREIN

BACKGROUND OF THE INVENTION

The present invention relates to a laser beam projection device and, more particularly, to an improved arrangement for mounting a laser plasma tube in such device in a precise orientation with respect to one or more optical elements of the projection device.

A number of different laser beam projection devices have been employed in the past in surveying and construction applications to provide either a rotating reference beam of laser light or a stationary beam of laser light. A rotating reference beam of laser light defines a reference plane which may be detected at locations remote from the projection device in order to measure elevations and grades. A stationary beam of light may be used to align various construction components, such as for example sections of drainage pipe, in a straight line.

As is well known, such projection devices commonly use a helium-neon gas laser which includes a gas mixture within a glass envelope, termed a plasma tube. The laser beam emerges from the plasma tube, is directed to various optical elements, such as lenses and mirrors, and emerges from the projection device either as a stationary beam or as a rotating beam of light.

One such projection device is shown in U.S. Pat. No. 4,062,634, issued Dec. 13, 1977, to Rando et al, and assigned to the assignee of the present invention. In the Rando et al device, the plasma tube is mounted by means of clam-shell type clamps on the support frame of the device. An optics arrangement, including a pair of adjustably mounted mirrors, deflects the light beam through approximately 180°. The mirrors are oriented by a technician to produce a laser beam which is aligned within requisite tolerances with a required beam path through the optical elements. A circular prism with its outer surfaces having a relatively small included angle may also be positioned in the beam path. To obtain fine adjustment of the beam orientation, the prism is rotated about its center.

One problem encountered with helium-neon lasers is that the alignment of the laser light beam with respect to the plasma tube, although constant for each individual plasma tube, varies from tube to tube. It has been common, therefore, to provide a series of adjustable optical elements in the laser projection device to align the beam properly after it emerges from the plasma tube. A difficulty arises when the plasma tube fails in such a device, the tube is removed and a replacement tube installed. Since the replacement tube produces a beam having a substantially different orientation than that produced by the original tube, a complete realignment of the adjustable optical elements is required. This process is time consuming and must be performed by a trained technician.

In order to facilitate plasma tube replacement, some projection devices have used plasma tubes which are pre-aligned within an outer casing to produce a beam aligned with the casing. With the casing mounted on and properly positioned with respect to a support frame of the laser beam projection device, the beam is then properly aligned with respect to optical elements mounted on the frame. This pre-alignment approach has not been particularly successful, however. A substantial difficulty that has been encountered in replacing such a pre-aligned plasma tube assembly is in positioning the plasma tube casing properly with respect to the support frame of the device. Additionally, such a replacement operation is typically complicated, requiring the disassembly of a large portion of the projection device.

Accordingly, it is seen that there is a need for a laser beam projection device including an arrangement for mounting the laser plasma tube in the projection device in which replacement of the plasma tube is simple and does not require substantial readjustment of optical elements.

SUMMARY OF THE INVENTION

A laser beam projection device fills the above need by providing a laser plasma tube assembly including a laser plasma tube and a generally cylindrical casing surrounding the tube in which the beam produced by the tube is aligned with the casing and emerges from the casing through a circular opening at one end thereof. A support frame mounts the laser plasma tube assembly and also mounts one or more optical elements in precise alignment with respect to the beam produced by the laser plasma tube assembly. The support frame includes an annular member for engaging the circular opening in the casing to align the casing with respect to the frame, and thereby to align the beam with respect to the optical element or elements.

The casing defines an inner beveled surface surrounding the opening through which the beam emerges and the annular member defines an outer, generally tapered surface which engages the inner beveled surface of the casing and holds the casing in alignment with the support frame. The support frame may further define a pair of non-parallel alignment surfaces which are spaced from the annular member to contact the outer surface of the casing near the end thereof opposite the circular opening, with the alignment surfaces being oriented generally in a V-configuration. A pair of mounting springs engage appropriate means on the support frame and on the casing to press the casing against the alignment surfaces and against the annular member to effect both mounting and alignment of the laser tube assembly on the support frame.

The means on the casing to engage the springs may comprise a pair of notches in the end of the casing opposite the circular opening. The means on the support frame to engage the springs may comprise means defining holes in the frame intermediate the annular member and the end of the casing defining the notches. The laser plasma tube may be potted in the generally cylindrical casing by means of an RTV silicone material.

The support frame may further comprise a pin extending toward the casing from between the alignment surfaces. The casing may define an opening to receive the pin, whereby proper orientation of the laser plasma tube assembly with respect to the support frame is achieved. The opening in the casing to receive the pin may comprise a slot in the end of the casing opposite the circular opening.

The outer, generally tapered surface may be frustoconical in shape. Alternatively, the outer, generally tapered surface may be frusto-spherical in shape.

Accordingly, it is an object of the present invention to provide a laser beam projection device including an arrangement for mounting a laser plasma tube in which replacement of the plasma tube may be accomplished simply and without the need for substantial recalibration; to provide such a device in which the plasma tube is mounted within a generally cylindrical casing and the beam produced by the plasma tube is aligned with the casing; to provide such a device in which a support frame includes an annular member for engaging the circular opening in the casing through which the beam emerges to align the casing with respect to the frame; to provide such device in which the casing defines an inner beveled surface surrounding the opening through which the beam merges and in which the annular member defines an outer, generally tapered surface which engages the inner beveled surface of the casing; to provide such a device further including a pair of non-parallel alignment surfaces spaced from the annular member to contact the outer surface of the casing near the end thereof opposite the circular opening; to provide such a device further including a pair of mounting springs which engage the casing and the frame and hold the casing in position on the frame; and to provide such a device in which the support frame further includes a pin extending toward the casing from between the alignment surfaces and the casing defines an opening to receive the pin.

Other objects and advantages of the invention will be apparent from the following description, the accompanying drawings and the appended claims

BRIEF DESCRIPTION OF THE DRAWINGS

FIG. 1 is a perspective view of the laser plasma tube assembly and support frame of the present invention, illustrating the manner in which the assembly is mounted on the frame;

FIG. 2 is a side view of the laser plasma tube assembly and support frame of FIG. 1;

FIG. 3 is an end view of the laser plasma tube assembly and support frame with the assembly mounted on the support frame, as seen looking generally right to left in FIG. 2; and FIG. 4 is a side view, partially in section, of the laser plasma tube assembly and support frame taken generally along line 4—4 in FIG. 3.

DETAILED DESCRIPTION OF THE PREFERRED EMBODIMENTS

Reference is now made to FIGS. 1-4 which illustrate a portion of a laser beam projection device constructed according to the present invention, and the arrangement for mounting a laser plasma tube 10 in the laser beam projection device to facilitate simple replacement of the laser plasma tube. A laser plasma tube assembly 12 includes the laser plasma tube 10 and a generally cylindrical casing 14 surrounding the tube 10. The plasma tube 10 is positioned within the casing 14 such that the beam produced by the tube 10 is aligned with the casing 14 and emerges from the casing 14 through a circular opening 16 at one end thereof.

A support frame 18 is provided for mounting the assembly 14 and also for mounting various optical elements, including retroflective prism 20, expander lens 22, and collimating lens 24, in precise alignment with respect to the beam produced by the laser plasma tube 10. The path of the beam is illustrated by dashed line 26 in FIG. 4. The frame 18 includes an annular member 28 which engages the circular opening 16, as best seen in FIG. 4. This aligns one end of the casing 14 with respect to the frame 18.

The casing 14 defines an inner beveled surface 30, as seen in FIG. 4, surrounding the opening 16 through which the beam emerges. The annular member 28 defines an outer, generally tapered surface 32 which engages the inner beveled surface 30 of the casing 14 and holds the casing 14 in alignment with the support frame 18. The tapered surface 32 is preferably frusto-spherical in shape. It may, however, be frusto-conical, or shaped in another fashion so as to engage securely the beveled surface 30.

The support frame 18 further defines a pair of non-parallel adjustment surfaces 34 which, as best seen in FIGS. 1 and 3, are oriented generally in a V-configuration. The alignment surfaces 34 are spaced from the annular member 28 to contact the outer surface of the casing 14 near the end thereof opposite the circular opening 16. Thus, the alignment surfaces accurately position the end of assembly 12 opposite opening 16. Because of the tapered surface 32 and beveled surface 30, positioning of the end of assembly 12 by surfaces 34 is not restricted by the engagement of opening 16 by annular member 28.

A pair of mounting springs 36 press the casing 14 against the alignment surfaces 34 and against the annular member 28 to effect mounting and to insure correct alignment of the laser tube assembly 12 on the support frame 18. The ends of the springs 36 are engaged by appropriate means on the casing 14 and the frame 18. A pair of notches 38 on the casing 14 engage one end of each of the springs, while a pair of holes 40, defined by the frame 18 intermediate the annular member 28 and the end of the casing defining the notches 38, engage the other end of each of the springs 36.

The support frame 18 further comprises a pin 42 which extends toward the casing 14. The casing 14 defines an opening 44 to receive the pin 42. The pin 42 and mating opening 44, which preferably may be configured as a slot in the end of the casing 14, insure that the casing is properly oriented with respect to the frame 18, and that the surfaces 34 are brought into contact with the desired portions of the exterior surface of the casing 14 to produce proper alignment of the assembly 12.

Although the orientation of the laser light beam produced varies from plasma tube to plasma tube, the present invention facilitates ready replacement of plasma tubes. Each plasma tube 10 is potted into a casing 14 by an RTV silicone material 46, or other suitable material, after the beam emerging from the plasma tube is precisely aligned with respect to the beveled surface 30 surrounding the opening 16 and with respect to the portions of the exterior surface of the casing 14 which will contact alignment surfaces 34. As a consequence, since each laser plasma tube assembly is pre-aligned in this fashion, the assemblies are readily interchangeable without the need to undertake extensive realignment and calibration of the projection device when the plasma tube is replaced. Further, since the assembly 12 is held in place on the frame 18 only by the pair of springs 36, it is apparent that it may be replaced quickly and simply.

Having described the invention in detail and by reference to preferred embodiments thereof, it will be apparent that modifications and variations are possible without departing from the scope of the invention defined in the appended claims. It will also be apparent that the laser plasma tube assembly and the support frame illustrated in the drawings may form a part of a laser beam projection device of the type which provides a stationary beam, or may be incorporated into a laser beam projection device of the type which produces a rotation beam defining a reference plane.

What is claimed is:

1. A laser beam projection device, comprising:
a laser plasma tube assembly including a laser plasma tube and a generally cylindrical casing surrounding said tube, said plasma tube being positioned within said casing such that the beam produced by said tube is aligned with said casing and emerges from said casing through a circular opening at one end thereof
defining an inner beveled surface surrounding said opening through which said beam emerges, and
a support frame for mounting said laser plasma tube assembly and for mounting one or more optical elements in precise alignment with respect to said beam produced by said laser plasma tube assembly, said frame including an annular member for engaging said circular opening in said casing to align said casing with respect to said frame and thereby to align said beam with respect to said optical element or elements
said annular member defines an outer generally tapered surface which engages said inner beveled surface of said casing and holds said casing in alignment with said support frame.

2. The laser beam projection device of claim 1 in which said support frame further defines a pair of non-parallel alignment surfaces, spaced from said annular member, to contact the outer surface of said casing near the end thereof opposite said circular opening, said alignment surfaces being oriented generally in a V-configuration.

3. The laser beam projection device of claim 2 further comprising a pair of mounting springs, and means on said support frame and means on said casing to engage opposite ends of said springs such that said springs press said casing against said alignment surfaces and against said annular member to effect both mounting and alignment of said laser tube assembly on said support frame.

4. The laser beam projection device of claim 3 in which said means on said casing to engage said springs comprises a pair of notches in the end of said casing opposite said circular opening, and in which said means on said support frame to engage the ends of said springs comprises means defining holes in said frame intermediate said annular member and the end of said casing defining said notches.

5. The laser beam projection device of claim 1 in which said laser plasma tube is potted in said generally cylindrical casing by means of an RTV silicone material.

6. The laser beam projection device of claim 2 in which said support frame further comprises a pin extending toward said casing, and in which said casing defines an opening to receive said pin, whereby proper orientation of said casing with respect to said support frame is achieved.

7. The laser beam projection device of claim 6 in which said opening in said casing to receive said pin comprises a slot in the end of said casing opposite said circular opening.

8. The laser beam projection device of claim 1 in which said outer, generally tapered surface is frusto-conical in shape.

9. The laser beam projection device of claim 1 in which said outer, generally tapered surface is frusto-spherical in shape.

10. An arrangement for mounting a laser plasma tube in a laser beam projection device to facilitate simple replacement of the laser plasma tube, comprising:
a generally cylindrical casing, open at both ends, for receiving the plasma tube therein in a permanently aligned position, said plasma tube producing a laser beam which is precisely oriented and aligned with respect to the end of the casing from which the beam emerges and with respect to at least a portion of the exterior surface of said casing, and
a support frame for mounting said cylindrical casing with said plasma tube therein, and for mounting one or more optical elements in precise alignment with respect to the beam produced by said laser plasma tube, said frame including an annular member having a tapered outer surface for engaging the opening end of the casing from which the beam emerges to align said casing with respect to said frame and thereby to align said beam with respect to said optical element or elements.

11. The arrangement of claim 10 in which said casing defines an inner beveled surface around the open end of the casing from which the beam emerges.

12. The arrangement of claim 11 in which said annular member defines an outer, generally tapered surface which engages said inner beveled surface of said casing.

13. The arrangement of claim 12 in which said outer, generally tapered surface is frusto-conical in shape.

14. The arrangement of claim 12 in which said outer, generaly tapered surface is frusto-spherical in shape.

15. The arrangement of claim 12 in which said frame defines a pair of alignment surfaces which are oriented generally in a V-shaped configuration and said alignment surfaces contact said portion of the exterior surface of said casing, said portion being adjacent the end of said casing opposite the end from which the beam emerges.

16. The arrangmeent of claim 15 in which said support frame further includes a pin and in which said casing defines an opening therein which receives said pin to insure proper orientation of said casing with respect to said frame.

17. The arrangement of claim 15 further comprising a pair of mounting springs, and means on said support frame and means on said casing to engage opposite ends of said springs, such that said springs press said casing against said alignment surfaces and said annular member.

* * * * *